United States Patent [19]
Boulos et al.

[11] Patent Number: 5,442,177
[45] Date of Patent: Aug. 15, 1995

[54] DUSK DELAY SYSTEM FOR OUTDOOR MOTION DETECTION

[75] Inventors: Charles A. Boulos, Milford, Mass.; Michael D. Sund, Walnut Creek; Syed M. A. Hussain, Diamond Bar, both of Calif.

[73] Assignee: Pace Control Technologies, Inc., Chino, Calif.

[21] Appl. No.: 300,936

[22] Filed: Sep. 6, 1994

Related U.S. Application Data

[63] Continuation of Ser. No. 951,385, Sep. 25, 1992, abandoned.

[51] Int. Cl.⁶ ................. G08B 13/193; G08B 13/191; H05B 37/02; F21V 23/00
[52] U.S. Cl. ................ 250/342; 250/DIG. 1; 315/159; 340/567
[58] Field of Search ............... 250/342, DIG. 1; 315/159, 156; 340/567

[56] References Cited
U.S. PATENT DOCUMENTS

| | | | |
|---|---|---|---|
| 3,961,180 | 6/1976 | Schultz | 250/206 |
| 4,305,021 | 12/1981 | Schreiden | 315/159 |
| 4,461,977 | 7/1984 | Pierpoint et al. | 315/159 |
| 4,768,020 | 8/1988 | Chen | 340/567 |

*Primary Examiner*—Constantine Hannaher
*Attorney, Agent, or Firm*—Morton J. Rosenberg; David I. Klein

[57] ABSTRACT

A dusk delay system for outdoor motion detection provides the benefits of dusk to dawn, timed, and motion detection control. A dusk to dawn type sensor detects the onset of darkness and turns on the lights for a predetermined duration of time. Once the duration of time expires, the lights will be shut off. Subsequently, motion within the monitored area will be detected by a motion detector and cause the light to be turned on for a selectably predetermined amount of time. The timer can randomize the actual time in which the lighting controller shuts off the light and goes into the motion detection mode. A latch mechanism disables the operation of the system upon momentary interruption of the power.

9 Claims, 4 Drawing Sheets

DUSK DELAY SYSTEM FOR OUTDOOR MOTION DETECTION

This is a continuation of application Ser. No. 07/951,385 filed on Sept. 25, 1992, now abandoned.

BACKGROUND

The present invention relates to devices designed for use with lighting systems, and particularly to a control system for a combination timer and motion detector for use with lighting which turns off the lighting after a certain time period after dark, and turns the lighting back on during the dark period upon detection of motion.

There are many situations where lighting needs to be controlled in an automatic manner. Timers have been used to turn off lighting at a precise time of day when a building is unoccupied to give the impression that people are present within the building. Such impressions lessen the likelihood that the building will be burglarized or vandalized. A major drawback to the use of a timer is the precision with which it operates. If a potential burglar or vandal notices that the lights are shut down at a precise time of day over a period of days, he might conclude that the building is unoccupied.

Many commonly obtainable timers are motor driven and based on a 24 hour period. The current required for the motor drive usually militates against the use of battery backup in small systems. As a result, a loss of power will cause such a system to shift its timing forward such that the lighting is turned on later and turned off later. The change in timing wastes electricity to the extent that the lighting is on during the daytime, and risks the impression of non-occupancy in the time period between the time when the lights should have been turned on and when they actually have been turned on.

Other systems for lighting control include the dusk to dawn control systems. These systems are configured to turn lights on and off solely based upon the amount of sunlight present. These systems are primarily designed to keep the perimeter of a building illuminated constantly, and are not intended to give an impression of building occupancy.

Controlling a lighting system based on the amount of sunlight present has disadvantages based upon energy usage. Since the illuminated area will remain illuminated all night, the energy consumption is greater than that which would be required for an illumination period lasting from one third to one half of the night time. Further, it may be easier to notice an illumination cycle which occurs solely at the dawn and dusk hours and which is therefore indicative of a dusk to dawn control system.

A further method of control for a light system is the use of the motion detector. A motion detector may use a variety of methods of detecting movement including infrared, sound, or visible optics. A simple motion detector may be activated to switch on a light upon the detection of motion. However, there may be significant amounts of normal activity during the early evening hours which would undesirably activate the lighting system which the motion detector is controlling.

In the case of a sonic detection system, cars or people may continue to move within the monitored area in the time period before illumination based upon movement is to occur. In the case of a light based detection system, car headlights from a high traffic level in the monitored area may cause the detection system to be repeatedly tripped in the early evening. Infrared based systems may repeatedly trip due to pedestrian traffic in the early evening. Such repeated tripping would reveal the presence of a motion detection system which could lead to its being disabled during the daylight hours. Ideally, a motion detection system should operate unexpectedly upon an intruder at a time when the intruder will most likely be in the monitored area improperly.

Another problem with controlled lighting systems is the effort required to override the timed, dusk to dawn, and motion detection controls. The user usually is forced to approach the timer box which may be remotely located from the light switch. The timer must be tripped, reset, or disabled, depending upon its configuration.

What is needed in lighting control technology is a method which eliminates several of the disadvantages in timer only, motion detection only, and dusk to dawn only lighting control. The presence of motion control should be masked during the early evening when continued activity is present. The timed turning on and off of the light should not occur at the same time each day. The motion control aspect of lighting control should be totally disabled in the daytime both to mask the presence of motion detection and to save energy in not lighting the area during daylight.

SUMMARY OF THE INVENTION

The dusk delay system for outdoor motion detection of the present invention provides the benefits of dusk to dawn, timed, and motion detection control combined in a way to largely eliminate the problems associated with the use of each of the control schemes singly. The dusk delay system of the present invention utilizes a dusk to dawn type sensor to detect the onset of darkness. As the surrounding monitored area becomes dark, the lights controlled by the control of the present invention switches the lights on. Motion within the monitored area will have no effect since the lights are already illuminated.

A few hours after dusk, a timer causes the lights to be turned off, after which the motion detection system is active to detect intrusions into the monitored area. For the remainder of the night, the lights remain off, and the controller remains in the motion detector mode. At sunup, the dusk to dawn sensor senses the daylight condition, and the motion detection mode is ended and the light remains off. The light continues to remain off during the day and until dusk when the system repeats its steps.

The timer can randomize the actual time in which the lighting controller shuts off the light and goes into the motion detection mode. In this manner, the time at which the light is observed to go off will be dependent both upon the occurrence of sundown and upon a randomization of the average time past sundown at which the motion detection mode is to be engaged.

The dusk delay system for outdoor motion detection of the present invention also provides a latch mechanism to disable the operation of the system. The user can shut the system power off, and then back on again within a half second to latch the lights into a full on condition. From the full on latched condition, the system can be returned to normal control by shutting power off for a few seconds followed by the re-introduction of power. The system can also be returned to normal operation by the occurrence of daylight conditions.

BRIEF DESCRIPTION OF THE DRAWINGS

Other aspects, features and advantages of the invention, its configuration, construction, and operation will be best understood from the following detailed description, taken in conjunction with the accompanying drawings in which.

DETAILED DESCRIPTION

Figure 1:
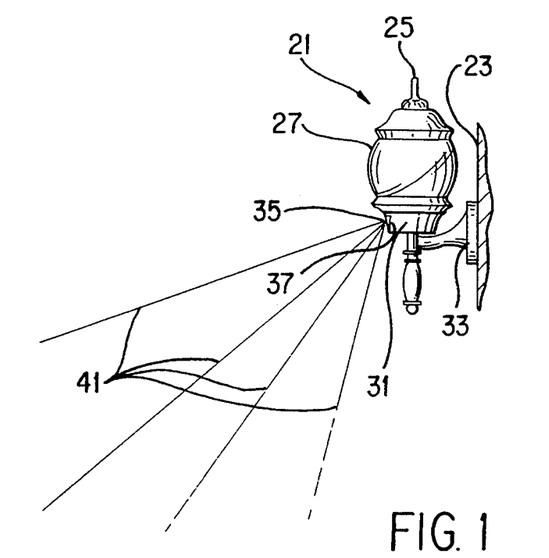
FIG. 1 is a side view of a typical exterior lighting fixture.

Referring to FIG. 1, a lighting fixture 21 is mounted on an outside wall 23, and may range in sophistication from ordinary to decorative. The fixture 21 shown in FIG. 1 is decorative. Fixture 21 has an upper dome 25 which is usually removable to facilitate the replacement of lamp bulbs if necessary. A transparent middle section contains glass windows 27 to both facilitate the transmission of light, and to protect the bulb or other source of light within lighting fixture 21.

A base 31 supports the glass windows 27, the lighting source within the lamp, and provides a pathway for the transmission of energy to the fixture, usually through a base mount portion 33 and the outside wall 23. The base 31 is swivelable with respect to the base mount portion 33 as will be seen in FIG. 2. At the forward most major surface of the base 31 is a fresnel lens 35 mounted in a window 37. The fresnel lens is typically a subdivided lens, containing many smaller lenses which focus electromagnetic energy in different directions.

The fresnel lens 35 used for the fixture 21 is intended for infrared electromagnetic energy transmission, and may therefore appear opaque with respect to electromagnetic energy in the visual portion of the spectrum. The use of a "sectioned", or multi section fresnel lens 35 concentrates the focal point of electromagnetic energy into a series of lines. A series of "rays" 41 are shown emanating from the fresnel lens 35 in FIG. 1. These are representative of projections of concentration from a point source at a distance behind the fresnel lens 35. A detector placed behind fresnel lens 35 would experience increased sensitivity to energy propagating along one of the projections of concentration, or rays 41 in front of the fixture 21.

Figure 2:
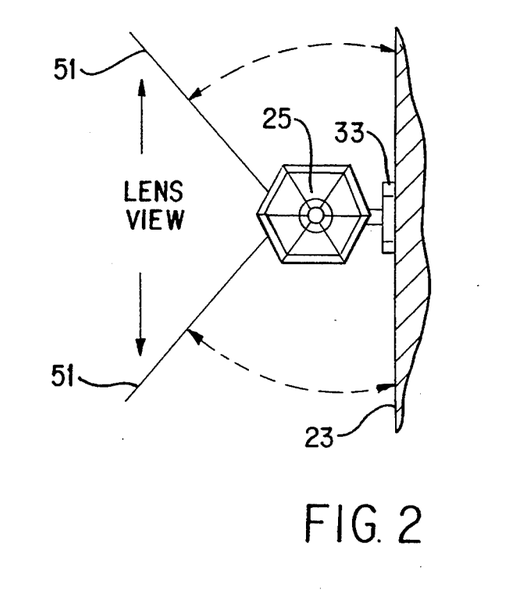
FIG. 2 is a top view of the lighting fixture of FIG. 1 illustrating the swiveling directivity of the motion detection monitored area.

Fixture 21 may be mounted to the left or right of a walkway or entrance to a building. As a result, the highest probability of detection of motion may occur in an area other than the. monitored area which projects in a direction normal to the window 37. Consequently, the base 37 may be swiveled with respect to base mount portion 33 to direct the monitored area to one side or the other of fixture 21. This is illustrated in FIG. 2. An angled boundary 51 illustrates the angular width of the monitored area. Dashed arrows illustrate the rotatability of the fixture 21, and consequent rotatability of the angular monitored area. In this way, the fixture 21 can be rotated to predominantly monitor an area to the right, left, or at an angle with respect to the base mount portion 33.

Figure 3:
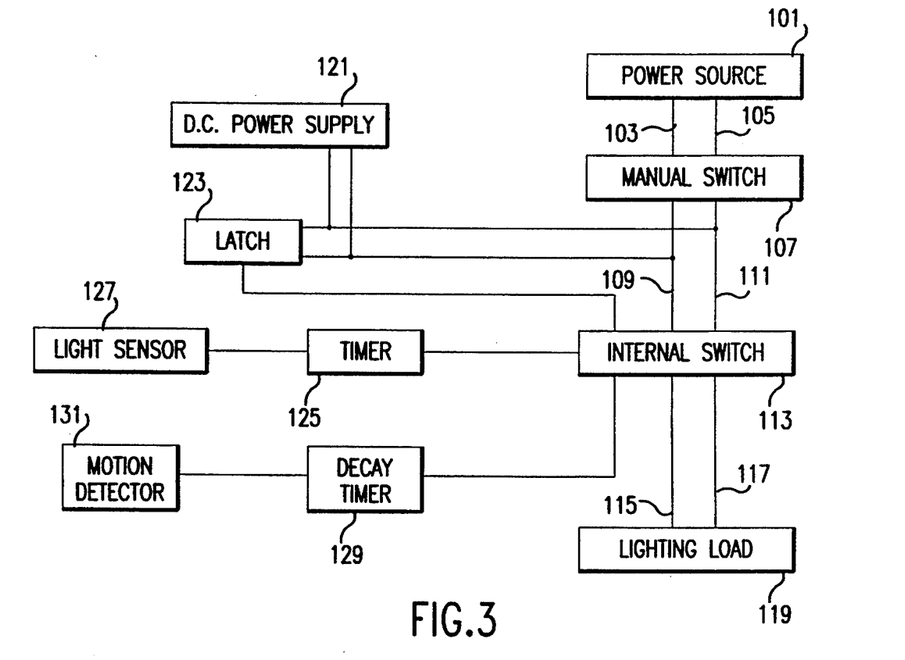
FIG. 3 is a block diagram illustrating the general layout of the dusk delay system for outdoor motion detection of the present invention.

Referring to FIG. 3, a power source 101 may be any type of power source but will most probably be an alternating current power source of the type found in homes and businesses. Power source 101 will most likely be a 115 volt alternating current power source. Power source 101 is connected by power lines 103 and 105 to a manual switch 107. In a residential application, manual switch 107 would be a wall switch similar to other wall switches used to operate internal and external home lighting. In an industrial application, manual switch 107 may be a lighting master switch used to operate a multiplicity of individual lighting units.

A pair of power lines 109 and 111 extend from the manual switch 107 to an internal switch 113. Internal switch 113 is typically a semiconductor type switch which is capable of actuation to the closed and open positions through the application of a small signal, such as a 5 volt signal used in transistor-transistor computer logic.

A pair of power lines 115 and 117 extend from the internal switch 113 to a lighting load 119. Lighting load 119 is representative of any of a number of lighting appliances including incandescent, fluorescent and halogen lamps. Lighting load 119 may include multiple lights, or it may include single lights, especially of the exterior decorative lights used in residential buildings.

Power lines 103 and 105, 109 and 111, and 115 and 117 are capable of handling the voltage and current demanded by the lighting load 119. Connected to the power lines 109 and 111 is a direct current power supply 121. Power supply 121 is connected to and supplies power to a latch 123 as well as to the other structures in the system of the present invention. Latch 123 is controllably connected to internal switch 113 to cause internal switch 113 remain closed upon engagement of the latch 123. If the power from the power lines direct current power supply to the latch 123 is interrupted and re-introduced within a short time, the latch is engaged, and causes internal switch 113 to remain closed.

Direct current power supply 121 draws a small amount of current from the power lines 109 and 111, and is used to power all of the circuitry shown in FIG. 3 with the exception of the manual switch 107 and the lighting load 119.

A timer 125 is connected to internal switch 113. Timer 125 is connected to cause the opening of internal switch 113 upon elapse of a specified time. The specified time before which timer 125 opens internal switch 113 may be randomized by timer 125 in order to prevent the opening of switch 113 too near to the same time each day. For example, if timer 125 were set for 4 hours, and was set to randomize about a 30 minute time period, the timer might open the internal switch 113 at any time between 3½ and 4½ hours. If the randomization were based upon a normal probability distribution, the internal switch 113 would on average open at a time nearer to 4 hours than nearer to the limits of its possible range of closing times.

A light sensor 127 is connected to timer 125. Light sensor 27 detects the onset of darkness and triggers the beginning of timing of timer 125. Light sensor 127 is preferably oriented and designed not to be triggered by automobile headlights nor brief cloudy periods. Slight changes in the time of sunset each day will cause the timer 125 to begin timing at correspondingly differing times of the day.

A decay timer 129 is also connected to internal switch 113. Decay timer 129 is connected to cause the closing of internal switch 113 and to hold internal switch 113 closed for a pre-selectable time period. Decay timer 129 is connected to a motion detector 131. Motion detector 131 triggers the decay timer 129 upon the detection of motion in an area to be monitored. Once the decay timer 129 is triggered by the motion detector 131, the decay timer continues to hold internal switch 113 closed for a pre-selectable period of time during which no new motion is detected by the motion detector 131. If motion detector 131 detects new motion during the time in which the decay timer 129 is holding the internal switch 113 open, the decay timer 129 is reset to continue holding internal switch 113 open for the preselected time since the last detection of motion occurred.

Figure 4A:
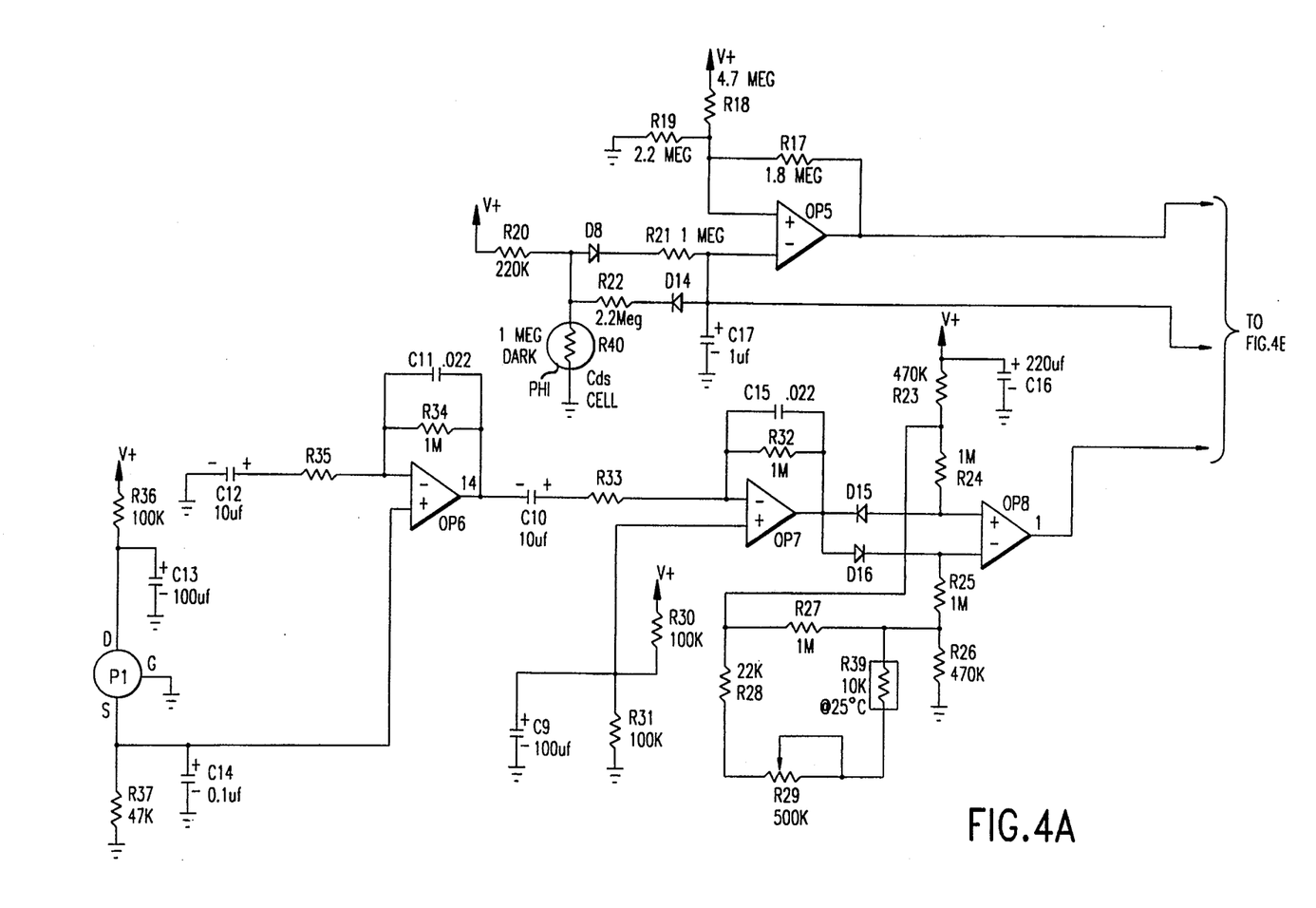
FIG. 4 is a circuit schematic illustrating an analog embodiment of the dusk delay system for outdoor motion detection shown in FIG. 3.
Figure 4B:
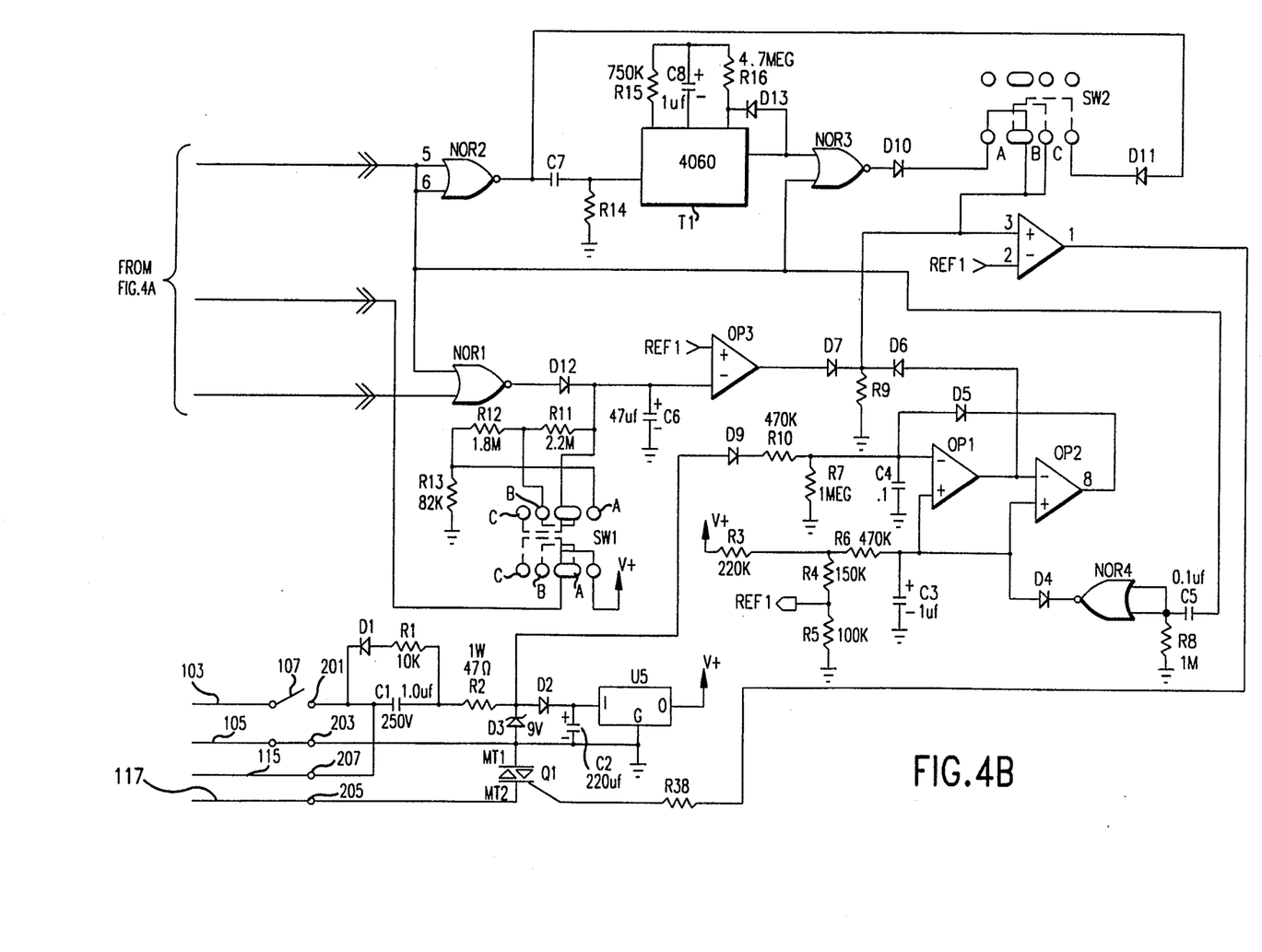

Referring to FIG. 4, a complete circuit diagram for the dusk delay system for outdoor motion detection of the present invention includes the functions shown in the blocks of FIG. 3 including the internal switch 113, direct current power supply 121, latch 123, timer 125, light sensor 127, decay timer 129 and motion detector 131.

At the bottom of FIG. 4, the power supply portion of the circuit is shown. Switch 107 is illustrated in series with a first terminal 201 and power supply line 103. Second terminal 203 is fed by power supply line 105 and completes the two wire power conduit for supplying alternating current power into the circuit of FIG. 4, and also further to the lighting load 119. Terminal 201 is connected to the cathode of a diode D1. The anode of diode D1 is connected to one side of a resistor R1 which has a nominal value of about 10k ohm. A capacitor C1 is connected in series between terminal 201 and the other side of resistor R1 and has a nominal value of about 1 microfarad. A resistor R2 having a nominal value of about 47 ohms is connected at the junction of connection between capacitor C1 and resistor R2.

The other side of resistor R2 is connected to the anode of a diode D2 and to the cathode of a zener diode D3. Zener diode D3 is set to hold the voltage at about 9 volts. The cathode of diode D2 is connected to a capacitor C2 which has a nominal value of about 220 microfarads. The other end of capacitor C2 and the anode of zener diode D3 are both connected to terminal 203.

The cathode of diode D2 and the terminal 203 are connected into a voltage regulator U5 through two separate connectors. A commercially available 78L05 voltage regulator U5 has been found to be adequate for this circuit. The direct current voltage output of the voltage regulator U5 is labeled V+ and indicate what is preferably a 5 volt power source. This 5 volt power source is utilized to power several circuit components of FIG. 4, as will subsequently be discussed.

The anode of zener diode D3 is connected to one side of a triac Q1. Triac Q1 may be the commercially available L2004f51. The other end of triac Q1 is connected to a terminal 205 which is connected to power line 117. A terminal 207 is connects terminal 201 with power supply line 115. Triac Q1 has a gate which will be referred to later.

At the latching portion of the circuit, the voltage supply V+ is made available to a resistor R3 having a nominal value of about 220k ohms. The other end of resistor R3 is connected to one end of a resistor R4 having a nominal value of about 150k ohms. The other end of resistor R4 is connected to one end of a resistor R5 having a nominal value of about 100k ohms. The other end of resistor R5 is connected to ground. The junction between resistors R5 and R4 form a reference REF1 which will be reintroduced into the schematic and discussed later.

The junction between resistors R3 and R4 is connected to one end of a resistor R6 which has a nominal value of about 470k ohms. The other end of resistor R6 is connected to a capacitor C3 having a nominal value of about 1 microfarad. The other end of capacitor C3 is connected to ground. The other end of resistor R6 is also connected to a the positive input of an operational amplifier OP1, the positive input of an operational amplifier OP2, and the anode of a diode D4. The output of operational amplifier OP1 is connected to the negative input of operational amplifier OP2.

The output of operational amplifier OP2 is connected to the cathode of a diode D5, while the anode of diode D5 is connected to the negative input of operational amplifier OP1. The negative input of operational amplifier OP1 is also connected to one end of a resistor R7 having a nominal resistance of 1 million ohms. The other end of resistor R7 is grounded. The negative input of operational amplifier OP1 is also connected to one end of a capacitor C4 having a nominal value of 0.1 microfarads. The other end of capacitor C4 is grounded.

The negative input of operational amplifier OP1 is also connected to one end of a resistor R10 having a nominal resistance of 470k ohms. The other end of resistor R10 is connected to the cathode of a diode D9, while the anode of diode D9 is connected to the anode of diode D2 and the cathode of zener diode D3.

The output of operational amplifier OP1 is connected to the anode of a diode D6. The cathode of diode D6 is connected to a resistor R9 having a nominal value of about 470k ohms. The other end of resistor R9 is grounded.

The decay timer 129 portion of the circuit includes a diode D7 having a cathode connected to the cathode of diode D6, and an anode connected to the output of an operational amplifier OP3. The negative input of operational amplifier OP3 is connected to the voltage reference REF1 which was previously discussed as being connected to the junction between resistors R4 and R5.

The positive input of operational amplifier OP3 is connected to one end of a capacitor C6 having a nominal value of about 47 microfarads. The other end of capacitor C6 is grounded. The positive input of operational amplifier OP3 is also connected to a switchably selectable series combination of resistors R11, R12, and R13, having nominal values of about 2.2 million ohms, 1.8 million ohms, and 82k ohms, respectively.

A dual triple pole switch set SW1 is wired to bypass one, two, or none of the resistors in the series. In position A, the switch SW1 bypasses the resistors R11 and R12, leaving only resistor R13 between the positive input of operational amplifier OP3 and ground. In position B, the switch SW1 bypasses the resistor R11 leaving resistors R12 and R13 between the positive input of operational amplifier OP3 and ground. In position C, the switch SW1 bypasses none of the resistors leaving resistors R11, R12 and R13 between the positive input of operational amplifier OP3 and ground. The parallel side of switch SW1 will be later discussed.

The positive input of operational amplifier OP3 is also connected to the cathode of a diode D12. The anode of diode D12 is connected to the output of a NOR gate NOR1.

The timer portion of the circuit includes a NOR gate NOR2 having a pair of inputs shorted together and connected to one input of NOR gate NOR1. NOR gate NOR 2 has an output connected to one end of a capacitor C7 which has a nominal value of about 0.1 microfarad. The other end of capacitor C7 is also connected to a resistor R14 having a nominal value of about 1 million ohms. The other end of resistor R14 is grounded. The other end of capacitor C7 is connected to the trigger input of a timer T1. Timer T1 may be the commercially available CMOS 4060B. Connected to the side of timer T1 is a series of circuit elements which determine the speed of the timer T1. A first end of a resistor R15 having a nominal value of 750k, a first end of a capacitor having a nominal value of 1 microfarad, and a first end of a resistor R16 having a nominal value of 4.7 million ohms are joined together. The second ends of resistors R15 and R16, and capacitor C8 are joined to the appropriate inputs of the timer T1.

The output of the timer T1 is connected to the anode of a diode D13, while the cathode of the diode D13 is connected to the second end of resistor R16. The output of the timer T1 is also connected to one input of a NOR gate NOR3. The other input of NOR gate NOR3 is connected to the inputs of NOR gate NOR2, to the previously mentioned one input of NOR gate NOR1, and to one end of a capacitor C5 having a nominal value of about 0.1 microfarads. The other end of capacitor C5 is connected to both inputs of a NOR gate NOR4. The output of NOR gate NOR4 is connected to the cathode of diode D4.

The output of NOR gate NOR3 is connected to the anode of a diode D10. The cathode of diode D10 is connected to the A pole of a three pole switch SW2. The B pole of three position switch SW2 is shorted with the selector portion of the switch. The C pole of the three position switch SW2 is connected to the cathode of a diode D11. The anode of diode D11 is connected to the output of NOR gate NOR2.

The B pole of switch SW1 is connected to the positive input of an operational amplifier OP4. The positive input of an operational amplifier OP4 is also connected to the cathodes of diodes D6 and D7. The negative input of operational amplifier OP4 is connected to the reference REF1 previously discussed. The output of operational amplifier OP4 is connected to one end of a resistor R38 having a nominal value of 680 ohms. The other end of resistor R38 is connected to the gate of triac Q1.

The light sensor 127 portion of the circuit is at the upper left side of FIG. 4. The 5 volt reference from voltage regulator U5 is introduced into one end of a resistor R18 having a nominal value of 470k ohms. The other end of resistor R18 is connected to one end of a resistor R19 having a nominal value of 220k ohms. The other end of resistor R19 is grounded. The other end of resistor R18 is also connected to one end of a resistor R17 having a nominal value of 220k ohms, and to the positive input of an operational amplifier OP5. The other end of resistor R17 is connected to the output of operational amplifier OP5.

The 5 volt reference from voltage regulator U5 is also introduced into one end of a resistor R20 having a nominal value of 220k ohms. The other end of resistor R20 is connected to a CdS photocell PH1 having a maximum nominal resistance of about 1 million ohms. The other end of photocell PH1 is grounded.

The other end of resistor R20 is connected to the anode of a diode D8. The cathode of diode D8 is connected to one end of a resistor R21 having a nominal value of about 1 million ohms. The other end of resistor R21 is connected to the negative input of operational amplifier OP5, and into the anode of a diode D14. The cathode of diode D14 is connected to one end of a resistor R22 having a nominal value of about 2.2 million ohms. The other end of resistor R22 is connected to the anode of diode D8 and to the photocell PH1. The cathode of diode D14 is connected to one end of a capacitor C17 having a nominal value of about 1 microfarad. The other end of capacitor C17 is grounded. The negative input of operational amplifier OP5 is also connected to the second side of parallel three position switch SW1 at the select pole. The A pole of the second side of parallel three position switch SW1 is connected to the 5 volt power supply, voltage regulator U5. When the A pole of switch SW1 is connected with the 5 volt power supply, the dusk delay system for outdoor motion detection assumes test status, and the motion detector can be tested, even during daylight.

The motion detection portion of the circuit is located at the left side of FIG. 4. The 5 volt power supply from voltage regulator U5 is made available to a resistor R36 which has a nominal value of 100k ohms. The other end of resistor R36 is connected to the drain of a pyroelectric detector P1, such as the commercially available Nippon RE-200B. The gate of the pyroelectric detector P1 is grounded. The source of the pyroelectric detector P1 is connected to a resistor R37 having a nominal value of 47k ohms and to a capacitor C14 having a nominal value of 0.1 microfarads. The other ends of resistor R37 and capacitor C14 are connected to ground.

The source of pyroelectric detector P1 is also connected to the positive input of an operational amplifier OP6. The negative input of operational amplifier OP6 is connected to a grounded series combination of a resistor R35 having a nominal value of about 22k ohms and a capacitor C12 having a nominal value of about 10.0 microfarads. The negative input and the output of operational amplifier OP6 is bridged by a parallel combination of a resistor R34 having a nominal value of about 1 million ohms and a capacitor C11 having a nominal value of about 0.022 microfarads.

The output of operational amplifier OP6 is connected to the negative input of an operational amplifier OP7 through a series combination of a capacitor C10 having a nominal value of about 10.0 microfarads, and a resistor R33 having a nominal value of about 22k ohms. The positive input of operational amplifier OP7 is connected to ground through a parallel combination of a capacitor C9 having a nominal value of about 100.0 microfarads, and a resistor R31 having a nominal value of about 100k ohms. The positive input of operational amplifier OP7 is also connected to the 5 volt power supply voltage regulator U5 through a resistor R30 having a nominal value of about 100k ohms.

The negative input and the output of operational amplifier OP7 is bridged by a parallel combination of a resistor R32 having a nominal value of about 1 million ohms and a capacitor C15 having a nominal value of about 0.022 microfarads. The output of operational amplifier OP7 is connected to the cathode of a diode D15 and to the anode of a diode D16. The anode of diode D15 and cathode of a diode D16 are connected to the positive and negative inputs, respectively, of an operational amplifier OP8.

The positive input of operational amplifier OP8 is connected to one end of a resistor R24 having a nominal value of about 1 million ohms. The other end of resistor R24 is connected to the 5 volt power supply voltage regulator U5 through a resistor R23 having a nominal value of about 1 million ohms. Here it can be seen that the 5 volt power supply is connected to ground through a capacitor C16 having a nominal value of about 220 microfarads.

The negative input of operational amplifier OP8 is connected to one end of a resistor R25 having a nominal value of about 1 million ohms. The other end of resistor R25 is connected to ground through a resistor R26 having a nominal value of about 470k ohms. The other end of resistor R25 is also connected to one end of a resistor R27 having a nominal value of about 1 million ohms, and to a thermistor R39 having a nominal value of about 10k oils at 250. The other end of resistor R39 is also connected to one end of an adjustable resistor R29 having a nominal value of about 500k ohms. The other end of resistor R29 is also connected to one end of a resistor R28 having a nominal value of about 22k ohms. The other end of resistor R28 is connected to the other end of a resistor R27 and to the junction between resistors R24 and R23.

The output of operational amplifier OP8 is connected to the other input of NOR gate NOR1, and the circuit is completed.

Figure 5:
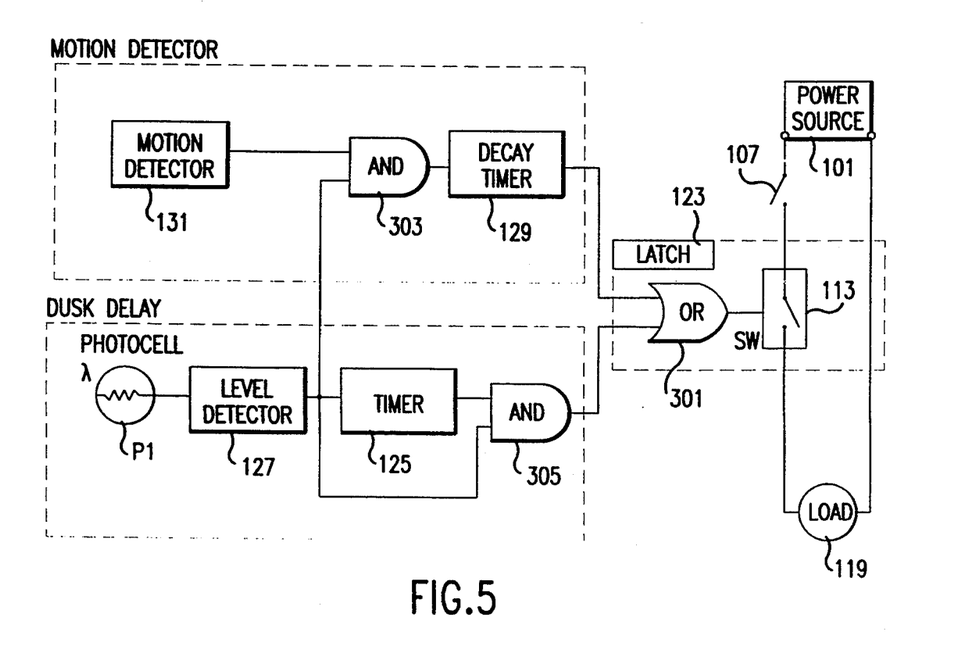
FIG. 5 is a logic block diagram illustrating the logic of operation of the dusk delay system for outdoor motion detection shown in FIGS. 3 and 4.

Referring to FIG. 5, a logic diagram of the operation of the dusk delay system for outdoor motion detection of the present invention provides a graphic representation of the interdependencies of the block diagram of FIG. 3. The source 101 is controlled manually by manual switch 107. Internal switch 113 is controllably connected to latch 123 and to a logical OR function 301. Latch 123 is sensibly connected to the power supplied through manual switch 107.

Thus, the actuation of the internal switch 113 can be accomplished from the latch 123 or the OR function 301. One input of the OR function 301 is controlled by the decay timer 129. Decay timer 129 is controlled by an AND function 303. One input of the AND function 303 is controlled by the output of motion sensor 131 while the other input of the AND function 303 is controlled by level detector 127.

The output of level detector 127 is input into the timer 125 and to one input of an AND function 305. The other input of the AND function 305 is the output of timer 125. The output of the AND function 305 is the other input to the OR function 301. In FIG. 5 it can be seen that the latch 123 can independently cause closure of the internal switch 113. It can also be seen that if the level detector output is high due to the darkness condition, the and functions 303 and 305 are enabled to thus enable the timer 125 and the motion sensor 131. Timer 125 is activated as soon as level detector 127 detects a dark condition. Timer 125 acts to keep AND function 305 on until the time set on the timer 125 expires, at which time the AND function 305 is disabled.

However, since level detector 127 continues to enable AND function 303 during the dark period, the motion sensor 131 is free to activate the decay timer 129 which in turn activates and holds activation of the or function 301 for a predetermined period. This holding function continues despite the absence of a signal from motion detector 131 due to lack of motion, and continues for the predetermined period. Additional movement will reset the holding function and restart the time during which the holding is to take place.

The operation of the dusk delay system for outdoor motion detection of the present invention generally has been explained using the block diagram of FIG. 3 and the logic diagram of FIG. 5. In the preferred embodiment, the system of the present invention has a variety of operation options. In the motion detection mode, the circuit has been specified to have 3 selectable time-out periods, namely 5 seconds, 2 minutes, and 5 minutes. The timer 125 is ideally set to activate the lighting load 119 for four hours at dusk before reverting to the motion detector mode. The dusk to dawn photoelectric detector turns on at dusk, and off at dawn. The latch 123 is a manual override which allows the lamp to be turned ON at any time from manual switch 107, such as a standard wall switch. This latching feature automatically resets to a de-latched condition at dawn.

When switch SW1 is placed in position A, a test is enabled to allow the checking of the installation and detection range of the dusk delay system for outdoor motion detection system. This test feature works in any light condition. Any motion will activate the lamp for a period of 5 seconds after motion ceases. The daylight sensor prevents operation during daylight hours.

Adjustment of the variable resistor R29 allows the setting of the detection sensitivity and range of from about 30 feet to less than 10 feet, based upon the use of the materials recited in the specification.

In normal operation, the dusk delay system for outdoor motion detection system will automatically turn on at dusk and remain on for a period of 4 hours and then revert to the standard motion detector mode. However, if power is removed or applied during the night while in this mode, the system will turn the lighting load on for a period of four hours before reverting to the motion detection mode. When the switch SW2 is switched to the C pole or position, the system will simply turn the lighting load on at dusk and remain on until dawn.

The latch 123 will allow the system to be remotely turned on from manual switch 107, such as a standard wall switch at any time by simply turning the wall switch off and then on within ½ second. However, the power must be applied for a minimum of 5 seconds before this manual override feature can be activated. In the event of a power outage which may potentially activate the override mode, and as an energy saving feature, the system will automatically reset the override mode and turn the lamp OFF at dawn. The system will then revert to any one of the other modes in a normal fashion. The override mode may be canceled at any time by turning the manual switch 107 off for at least 5 seconds then back on.

The operation of the circuitry in FIG. 4 is as follows. As the power is applied to terminals 201 and 203, the capacitor C1 acts to limit the current to the zener diode D3. The zener diode Z3 and Diode D2 set the input voltage to the voltage regulator U5 to a little less than 9 volts. As soon as power is applied, to the zener diode D3, the negative input to the operational amplifier OP1 quickly charges. The positive input to the operational amplifier OP1 charges more slowly, and is supported by a relatively large capacitor. As a consequence of this relative speed in charging the operational amplifier OP1 inputs, the output is initially low.

This low output is initially supplied to the positive input of operational amplifier OP4. Combined with the input of REF1 to the negative input of operational amplifier OP4, the output of OP4 is low, and applied to triac Q1 through resistor R38, keeping triac Q1 initially open.

When set to enable full dusk actuation followed by motion detection, the position of SW2 is in the A position. If it is night time, the resistance of photocell PH1 will be at its maximum, and the negative input to the operational amplifier OP5 will be higher than the level of the voltage of the voltage divider formed by R18 and R19 at about 220/690×5 volts. Consequently the output of OP5 begins in the "low" level due to its input circuitry. A low input to NOR2 causes a "high" NOR2 output, thus starting the timer T1. The output of the timer is initially low causing the output of NOR3 to be initially high, thus causing operational amplifier to be driven high, since the 5 volt-0.7 volt signal from NOR3 is more than the 100/570×5 volt signal from REF1. This gates triac Q1 open and the lighting load 119 is energized.

If the system is energized in the daylight, the positive input to operational amplifier OP5 will prevail, the output of NOR2 and NOR1 will be "low" the output of operational amplifier OP5 will be "low", the negative input to operational amplifier OP4 will prevail making the output of operational amplifier OP4 low, and preventing the triggering of triac Q1.

In the case where the system is energized in darkness, the timer T1 output is low until the time, preferably about four hours, runs out. When time runs out, the output of timer T1 goes "high", driving the positive input of operational amplifier OP4 and the output of operational amplifier OP4 "low". This triggers the gate of triac Q1 through resistor R38 to close, and shuts off the lighting load 119.

After lighting load 119 is shut off, the motion detection portion of the circuit may thereafter detect motion. Upon detection of motion, the pyroelectric detector P1 causes the positive input to operational amplifier OP6 to go "high", triggering the negative input to operational amplifier OP7 which causes the output of operational amplifier OP7 to go "low." A "low" signal at the output of operational amplifier OP7, in conjunction with the diodes D15 and D16, causes the output of the operational amplifier OP8 to go "low."

Since the other input to NOR gate NOR1 is "low" during darkness periods, a "low" signal from operational amplifier OP8 into NOR gate NOR1 causes its output to be "high." This "high" output propagates through operational amplifier OP3, diode D7, and the positive input of operational amplifier OP4, thus triggering triac Q1 through resistor R38, triggering triac Q1 closed.

Once the motion detected by the pyroelectric detector P1 ceases, the positive charge held by capacitor C6 and against diode D12 begins draining through the resistors R11, R12, and R13, depending upon the setting of the switch SW1. The current can switchably be caused to drain through resistor R13 alone for the quickest drain, through resistors R12 and R13 for the next quickest drain, and through resistors R12, R13 and R14 for the slowest drain. The resistance values of R12, R13 and R14, and the capacity of capacitor C6 will ideally correspond to the earlier mentioned time periods of 5 seconds, 2 minutes, and 5 minutes.

When the latch 123 is used, the power to terminals 201 and 203 is temporarily interrupted. Normally, the negative input to operational amplifier OP1 is significantly higher than the divided voltage available at its positive input available from the junction between resistors R4 and R5 and through resistor R6. In this case, the voltage at diode D6 is "low." Further, a low input to the negative input of operational amplifier OP2 causes the positive input to predominate, and thus the output of operational amplifier OP2 is "high." This "high" potential is transmitted back to the negative input of operational amplifier OP1, reinforcing its initial state. Although the voltage at the negative input to operational amplifier OP1 is higher than the voltage at the positive input to the to the operational amplifier OP1, the positive input is supported by a larger capacitor and can hold its positive bias longer.

When power is interrupted, the negative input to OP1 drains to ground much faster than the positive input. When the power is quickly re-introduced, the positive inputs to the operational amplifiers OP1 and OP2 are "high." This "high" state is transmitted through diode D6, the positive input to operational amplifier OP4 and on to close triac Q1. The "high" state at the output of operational amplifier OP1 dominates the negative input of operational amplifier OP2, causing the output of OP2 to go "low". This "low" output communicates with the negative input of operational amplifier OP1 through diode D5, to keep it "low", allowing the positive input of operational amplifier OP1 to dominate, thus keeping the output of OP1 "high."

However, when the presence of daylight occurs, operational amplifier OP5 goes "high", and this potential is transmitted to the inputs of NOR4. This causes the output of NOR4 to go "low", and the input of NOR4 begins draining current through the diode D4 from the positive inputs to the operational amplifiers OP1 and OP2. The current drain enables the potential on the positive inputs to the operational amplifiers OP1 and OP2 to dominate. This causes a "low" potential to be transmitted through diode D6 to OP4, while the REF1 input to OP4 dominates causing a "low" input to be transmitted through R38 to triac Q1, causing triac Q1 to open, shutting off the lighting load 119.

When switch SW2 is placed at pole B, the positive input to operational amplifier OP4 is isolated from the timing and dusk daylight circuitry. The system then acts purely as a motion detector.

When switch SW2 is placed at pole C, the positive input to operational amplifier OP4 is affected by dusk dawn sensor. Since a daylight condition results in a "high" input into both the NOR gate NOR2 and the NOR gate NOR1 the outputs of those NOR gates are "low", and the "low" output from NOR gate NOR2 is transmitted through diode D11, pole C of switch SW2, causing the output of operational amplifier OP4 to be "low", thus opening triac switch Q1.

Alternatively, a night condition results in a "low" input into both the NOR gate NOR2 and the NOR gate NOR1 causing the outputs of those NOR gates to be "high". The "high" output from NOR gate NOR2 is transmitted through diode D11, pole C of switch SW2, causing the output of operational amplifier OP4 to be "high", thus opening triac switch Q1. In an alternate path, the "high" output from NOR gate NOR1 is transmitted through diode D12 and into the positive input of operational amplifier OP1 to cause the output of operational amplifier OP1 to be "high". This "high" output of operational amplifier OP1 is transmitted through diode D7 to the positive input of operational amplifier OP4, thus causing the output of operational amplifier OP4 to be "high", opening triac switch Q1.

When switch SW1 is placed in the A position, the voltage reference is made available to the negative input of operational amplifier OP5 causing the output of operational amplifier OP5 to be "low." This "low" condition is equivalent to a night time signal, effectively forcing the circuit to assume a night time operational standing. In this mode, the motion detection capability can be tested, even in daylight. This feature facilitates the ability to test and adjust the system, especially during daylight hours when the system is most likely to be installed and tested.

Although the invention has been described with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A dusk delay system for outdoor motion detection, comprising:
    switch means for controlling transmission of a source of power to a load, said switch means including input means for coupling the source of power to the load responsive to receipt of one of a plurality of control signals, said plurality of control signals being defined by a first control signal and a second control signal;
    motion detector means for generating a motion signal on an output thereof responsive to detection of movement in a monitored area;
    light sensor means for generating a detection signal on an output thereof responsive to an ambient light level being below a predetermined threshold value;
    signal transmission means having a first input coupled to said output of said motion detector means and a second input coupled said output of said light sensor means for coupling said motion signal from said first input to an output thereof responsive to receipt of said detection signal;
    first timer means having an input coupled to said output of said signal transmission means for generating said first control signal for a first predetermined duration of time; and,
    second timer means having an input coupled to said output of said light sensor means for generating said second control signal for a second predetermined duration of time, said second predetermined duration of time being greater than said first predetermined duration of time, wherein the load is coupled to the source of power for a time period defined by said second predetermined duration of time when said ambient light level is below said predetermined value, subsequent to expiration of said second predetermined duration of time the load is coupled to the source of power for a time period defined by said first predetermined duration of time when said ambient light level is below said predetermined value and said motion detector means detects movement within the monitored area.

2. The dusk delay system for outdoor motion detection as recited in claim 1 further comprising latch means connected to said switch means for holding said switch means closed when said source of power is temporarily interrupted.

3. The dusk delay system for outdoor motion detection as recited in claim 1 further comprising a selector switch coupled to said first timer means for manually selecting said first predetermined duration of time.

4. The dusk delay system for outdoor motion detection as recited in claim 1 further comprising a power supply, powerable by said power source and connected to said switch means, said motion detector means, said first timer means and said light sensor means.

5. The dusk delay system for outdoor motion detection as recited in claim 4 wherein said power supply further comprises:
    current limiting means, powerable by said power source, for limiting the power drawn from said power source;
    voltage clamping means, connected to said current limiting means, for limiting the maximum voltage obtainable from said power source; and
    voltage regulation means, connected to said voltage clamping means, for providing constant voltage power.

6. The dusk delay system for outdoor motion detection as recited in claim 1 wherein said motion detector means further comprises an infrared motion detector.

7. The dusk delay system for outdoor motion detection as recited in claim 1 wherein said motion detector means further comprises means for changing the size of the monitored area.

8. The dusk delay system for outdoor motion detection as recited in claim 1 wherein said motion detector means further comprises:
    a pyroelectric detector;
    a segmented fresnel lens in optical alignment with said pyroelectric detector; and
    motion detector circuitry connected to said pyroelectric detector for generating a motion signal upon the detection of movement in a monitored area.

9. The dusk delay system for outdoor motion detection as recited in claim 1 wherein said light sensor means further comprises:
    a photocell, said photocell generating a signal on an output thereof responsive to said ambient light level;
    light level detection circuitry connected to said output of said photocell for generating said detection signal responsive to said signal from said photocell defining an ambient light level below said predetermined threshold value for at least a predetermined time period; and,
    test switch means having a first output coupled to said light level detection circuitry for applying a bias voltage thereto to generate said detection signal irrespective of said ambient light level and a second output coupled to said second timer means for substantially reducing said second predetermined duration of time to thereby enable testing of said motion detector means.

* * * * *